(12) United States Patent
Waggoner et al.

(10) Patent No.: US 11,218,743 B1
(45) Date of Patent: Jan. 4, 2022

(54) LINEAR LIGHT SCALING SERVICE FOR NON-LINEAR LIGHT PIXEL VALUES

(71) Applicant: Amazon Technologies, Inc., Seattle, WA (US)

(72) Inventors: Charles Benjamin Waggoner, Portland, OR (US); Hai Wei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/916,721

(22) Filed: Jun. 30, 2020

(51) Int. Cl.
  *H04N 21/2343* (2011.01)
  *H04N 21/2662* (2011.01)
  *H04N 21/239* (2011.01)
  *H04N 11/20* (2006.01)

(52) U.S. Cl.
  CPC ......... *H04N 21/2343* (2013.01); *H04N 11/20* (2013.01); *H04N 21/2393* (2013.01); *H04N 21/2662* (2013.01)

(58) Field of Classification Search
  CPC ............... H04N 21/2343; H04N 11/20; H04N 21/2393; H04N 21/2662
  See application file for complete search history.

(56) References Cited

U.S. PATENT DOCUMENTS

| | | | |
|---|---|---|---|
| 2010/0123910 A1* | 5/2010 | Mitchell | H04N 1/6058 358/1.9 |
| 2019/0027082 A1* | 1/2019 | Van Belle | G09G 3/20 |
| 2019/0356940 A1* | 11/2019 | Mallett | G06F 3/1446 |

* cited by examiner

*Primary Examiner* — Michael E Teitelbaum
(74) *Attorney, Agent, or Firm* — Nicholson De Vos Webster & Elliott LLP

(57) ABSTRACT

Techniques for a fast approximation of linear light scaling for inputs of non-linear light values are described. As one example, a computer-implemented method includes receiving a request to downscale a plurality of pixels of a single frame of a video file performing, in response to the request to downscale, a lookup in a lookup table for a first input of a first non-linear light value of luminance for a first pixel of the plurality of pixels and a second input of a second non-linear light value of luminance for a second pixel of the plurality of pixels to generate an output of a third single non-linear light value of luminance for a linear light scaling for the first pixel and the second pixel, generating a scaled frame based at least in part on the third single non-linear light value of luminance for the linear light scaling, receiving a request for a manifest for the video file from a client device, generating the manifest for the client device that identifies a scaled video representation that comprises the scaled frame, and sending the manifest to the client device.

20 Claims, 10 Drawing Sheets

US 11,218,743 B1

LINEAR LIGHT SCALING SERVICE FOR NON-LINEAR LIGHT PIXEL VALUES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
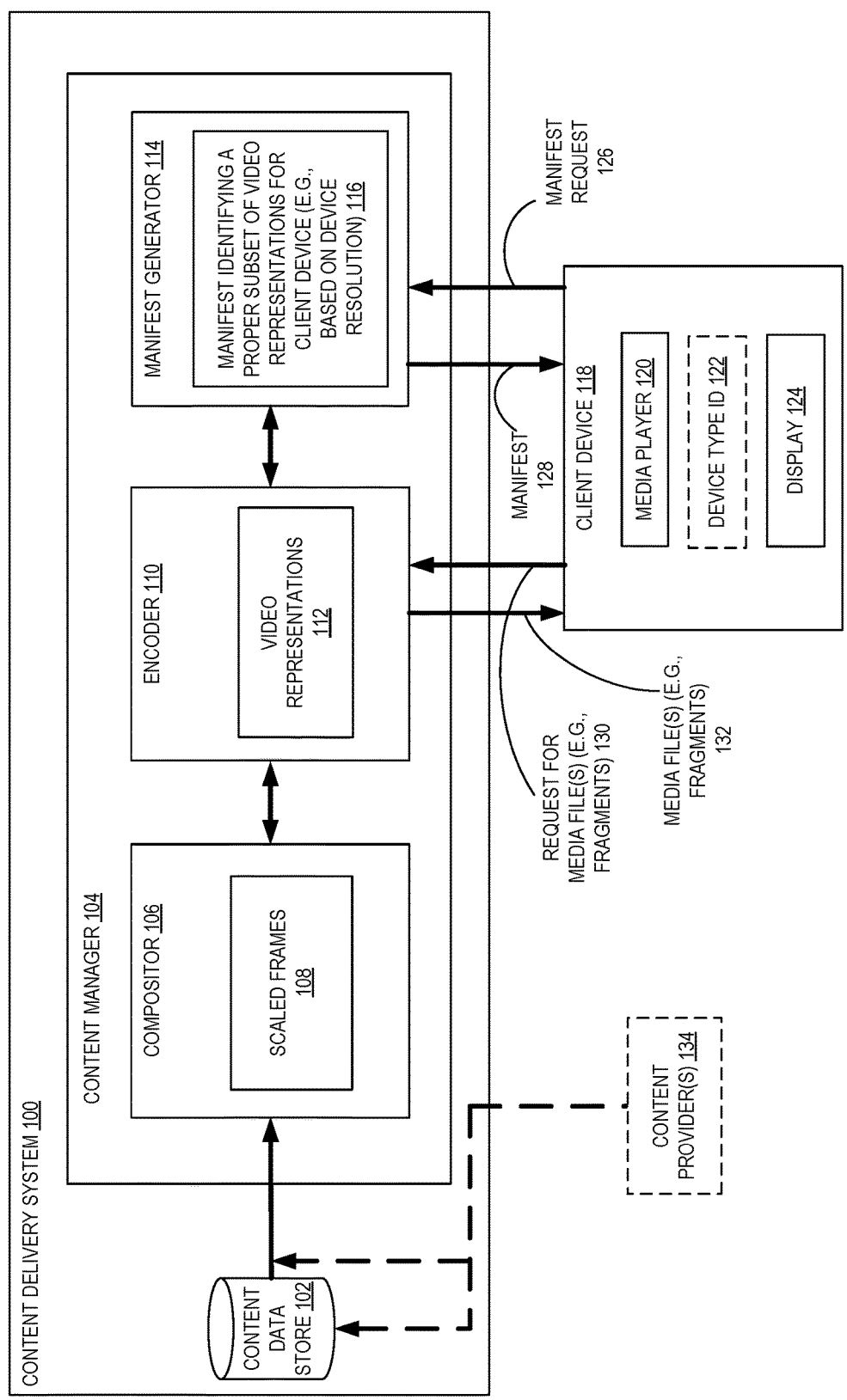
FIG. 1 is a diagram illustrating an environment including a content delivery system having a compositor according to some embodiments.

Various embodiments of methods, apparatuses, systems, and non-transitory computer-readable storage media for linear light scaling are described. According to some embodiments, a content delivery system includes a scaling service that is to scale multiple pixels (e.g., color space component values thereof) into a single pixel, for example, to fit source content to a display window size (e.g., the size being all or a proper subset of a physical display of a client device). Certain embodiments herein provide a fast approximation of linear light scaling for inputs of non-linear light values, e.g., with the output of the fast approximation being a non-linear light value.

In certain embodiments, a color space (e.g., format) is the quantitative links (e.g., mathematical relationships) between distributions of wavelengths in the electromagnetic visible spectrum and physiologically perceived colors in human color vision. In certain embodiments, a video file is formed from a plurality of frames, and each frame may be formed from rows and columns of pixels. Similarly, a digital image may be formed from rows and columns of pixels. A pixel can be specified by saying which column and which row contains it. In terms of coordinates, a pixel can be identified by a pair of integers giving the column number and the row number.

To change the scale of (e.g., downscale) a video file (or image), it may be desirable to combine multiple pixels into a single "equivalent" pixel in the scaled video file (or scaled image). However, in certain embodiments a color space (e.g., encoding standard thereof) may not allow for linear light scaling of multiple pixels into a single pixel based on the component (e.g., non-linear light) formats for that color space. For example, using (e.g., integer) values of a (e.g., non-linear light) color space component (e.g., a luma component) (e.g., of a video according to a Standard Dynamic Range (SDR) standard) of multiple pixels, the scaling of the multiple pixels into a single corresponding pixel can be achieved by using the arithmetic mean of the (e.g. integer) values (e.g., on an integer scale of 0-255, 0-1023, etc.). For example, if scaling down 50%, a first pixel having a component (e.g., luminance) value of 16 and a second pixel having a component (e.g., luminance) value of 48 could be averaged into a single scaled pixel value of 32 (e.g., for code values of that color space). That is an artifact of the use of (e.g., non-hybrid) (e.g., conventional) gamma as the electro-optical transfer function (EOTF). However, certain other color spaces may use a different EOTF, for example, with a video according to a High Dynamic Range (HRD) standard using a perceptual quantizer (PQ) EOTF, e.g., where each color space component value specifies a particular light output level in candela per square meter (symbol: cd/m$^2$), commonly called "nits." However, certain EOTFs (such as PQ) are parametric transforms where simply taking the arithmetic mean of the (e.g., integer) values will result in changes to the overall luminescence of the frame (or image) as perceived by a human.

Thus, to perform a linear light scaling (e.g., in floating-point values) of non-linear light (e.g., integer) values (e.g., of luminance) (e.g., non-linear light values that are encoded according to an HDR standard), certain scaling services are to convert the non-linear light (e.g., integer) values (e.g., of luminance) into linear light (e.g., floating-point) values. One example of this is converting the original integer components of a first (e.g., non-linear light) color space (e.g., 10-bits for each of a luminance and two chrominance components (e.g., in [4:2:0] compression, where the 4 is the width of a block of pixels, the 2 is the number indicating how many pixels are taken from the top row of the original block, and 0 is the number indicating how many pixels are taken from the bottom row of the original block) for a total of 30 bits per pixel) to floating-point (e.g., 32-bit floating-point) values for each component of a second (e.g., linear light) color space (e.g., 32 bits each for R, G, B, and Alpha components for a total of 128 bits per pixel), and then converted back to integer components of a first (e.g., non-linear light) color space (e.g., 10-bit [4:2:0]). Such actions are computationally, temporally, and memory bandwidth expensive.

Certain embodiments herein avoid performing (e.g., during lookup of a linear light scaled output) those numerous conversions, e.g., for a frame having 10s, 100s, 1000s, etc. of pixels to process in a scaling operation. Thus, embodiments herein improve the functioning of a computing system being tasked with a scaling operation and a computer-implemented method of performing a scaling operation, e.g., via approximating the output for a linear light (e.g., floating-point) scaling operation (e.g., without performing a plurality of such conversions). In certain of those embodiments, the linear light (e.g., floating-point) scaling operation includes performing a lookup in a lookup table populated according to this disclosure, for example, (i) performing a lookup in a lookup table for a first input of a first non-linear light value of luminance for a first pixel of a plurality of pixels of a video frame and a second input of a second non-linear light value of luminance for a second pixel of the plurality of pixels to generate an output of a third single non-linear light value of luminance for a linear light scaling for the first pixel and the second pixel, or (ii) performing a lookup in a lookup table for a first input of a first integer value of a color space component for a first pixel of a plurality of pixels of a video file and a second input of a second integer value of the color space component for a second pixel of the plurality of pixels to generate an output of a third single integer value of the color space component (e.g., luma component) for a floating-point scaling for the first pixel and the second pixel. Certain embodiments here utilize a lookup table based fast approximation of linear light scaling.

Additionally, scaling service (e.g., an algorithm thereof) may perform additional scaling operations on the output from the lookup table, e.g., a complex combining of source pixels with a (e.g., unequal) weighting that is applied on top of the results of the lookup table. For example, scaling down two times can involve the single resultant pixel (2,2) being coded as the average of three pixels (1,1), (1,2), and (2,1) or four pixels (1,1), (1,2), (2,1), and (2,2). In certain embodiments, the output from the lookup table (e.g., for each combination of pairs of pixels) may be used, e.g., with an arithmetic mean operation then performed on each of the outputs from the lookup table.

The below examples generally discuss a luma component of a set of color space components, but it should be understood that the below is applicable to other components of the set of color space components (e.g., chrominance components, such as, but not limited to, blue chrominance and red chrominance).

For example, "YUV" is a color space (e.g., color encoding scheme) that may be used as part of a color image pipeline. In certain embodiments, the selected color space encodes a color image or video taking human perception into account, allowing reduced bandwidth for chrominance components, and generally enabling transmission errors or compression artifacts to be more efficiently masked by the human perception than using a "direct" red green blue (RGB) representation. A color space may encode brightness information (e.g., luma component Y) separately from color information (e.g., chrominance components U and V). YUV may be used as a general term encompassing (i) YUV-analog phase alternating line (PAL) encoding, (ii) YIQ-analog national television system committee (NTSC) encoding, and (iii) YCbCr-digital encoding.

Original black and white TV was broadcast by transmitting an analog signal representing just the luminance of the image. When color was introduced into television, the black and white luma system was not just thrown away. Chrominance (or color) information (e.g., designated as U and V) was added separately via a sub-carrier so that a black-and-white receiver would still be able to receive and display a color picture transmission in the receiver's native black-and-white format. In certain embodiments, U and V components provide color information and are color difference signals of blue minus luma (e.g., B-Y) and red minus luma (e.g., R-Y).

Y prime (Y') generally refers to a gamma compressed luminance Y (e.g., Y' being referred to as the "luma" component) (the brightness) and U and V are the chrominance (color) components, e.g., with "luminance" Y referring to physical linear-space brightness, while "luma" Y' referring to (e.g., non-linear) perceptual brightness.

In certain embodiments, a YPbPr color space is used in analog component video and its digital version YCbCr is used in digital video, e.g., where Cb/Pb and Cr/Pr are deviations from grey on blue-yellow and red-cyan axes, respectively, whereas U and V are blue-luminance and red-luminance differences, respectively.

FIG. 1 is a diagram illustrating an environment 101 including a content delivery system 100 having a compositor 114 according to some embodiments. The depicted content delivery system 100 includes a content data store 102, which may be implemented in one or more data centers. As one example, a media file (e.g., a video) that is to be processed (e.g., encoded for playback by a client device 118) is accessed from the content data store 102 by content manager 104. In certain embodiments, compositor 106 receives a media file (e.g., a video) and a request to change the scale (e.g., downscale by a given value (e.g., percentage)) and forms scaled frame(s) 108 therefrom.

In one embodiment, the encoder 110 is to then encode the scaled frames 108 of the media file into one or a plurality of video representations 112 (e.g., streams). It is generally unrealistic to encode the media file into an almost boundless number of video representations. Instead, embodiments herein generate a manifest of the available video representations (e.g., stored in content delivery system 100) and form a set of manifest 116 identifying the available video representations, e.g., for playing by a media player 120 of a particular client device 116 (e.g., based on the client device's display 124 resolution). In certain embodiments, the content is stored in the content delivery system 100 in two parts: (i) the manifest of all available video representations (e.g., their URL addresses and, optionally, other characteristics, and (ii) the video representations (e.g., stream of segments) in a single or multiple files. In one embodiment, a client device is to read (or store) a manifest before the client device may make a request for the media from that manifest.

Client device 118 includes a media player 120 (e.g., to play media streams) and a display 124 to show the video of the media file (e.g., video file). Client device 118 may include storage that stores a device type identification (DTID) value 122 to indicate the client device's (e.g., maximum) resolution of its display 124.

As one example, a client device 118 sends a manifest request 126 for a manifest of a media file (e.g., video file) of content delivery system 102. In certain embodiments, receipt of manifest request 126 causes manifest generator to determine the device resolution (e.g., from a field of device type ID 122, and thus send back a manifest 128 identifying media file(s), e.g., the one or more video representations for that particular device based on that device resolution. Client device 118 may send a request 130 for a media file(s) (e.g., as identified by the manifest 128) and then receive the media file(s) 132, e.g., from content delivery system 100.

In certain embodiments, the media file (e.g., a video) from content data store 102 and/or content providers 134 is to be resized by compositor 106, for example, such that the scaled frames fit the display 124 or a proper subset of the display allotted to displaying the media file. As discussed above, the media file (e.g., video) received by compositor 106 may be in a color space (e.g., encoding) for non-linear light, e.g., such that the value representing the color space components are non-linear light values. Non-limiting examples of non-linear light values are integers having a width of 8 bits, 10 bits, 12 bits, 14 bits, 15 bits, 16 bits (e.g., for each component of multiple color space components of a pixel). Non-limiting example of linear light values (e.g., where the number directly corresponds to the amount of light emitted) but may results in disproportionately more samples near white and fewer near black. In certain embodiments, floating-point numbers are used for linear light value, e.g., with a sign bit (e.g., 1 bit), exponent width bits (e.g., 8 bits in binary 32 floating-point format), and significand precision bits (e.g., 24 bits with 23 explicitly stored in binary 32 floating-point format). Thus, in certain embodiments, floating-point numbers are used to represent linear light levels with the spacing of the samples semi-logarithmically. In certain embodiments, floating-point representations allow for drastically larger dynamic ranges than integer representations.

However, techniques for linear light scaling to generate scaled frames may cause the conversion of the input values for the media file (e.g., video) from non-linear light values that the media file (e.g., video) is provided in, e.g., by content providers 134 (which may be third parties) to a linear light value, scaled, and then converted back to non-linear light values that the encoder 110 expects to receive. Embodiments herein thus (i) allow the creation of content by content providers 134 without requiring them to provide non-linear light values and/or (ii) allow non-linear light values to be input into or used by content manager 104 without requiring respective conversions between non-linear and linear light values, e.g., to create and/or use scaled frames 108 without requiring respective conversions between non-linear and linear light values.

Figure 2:
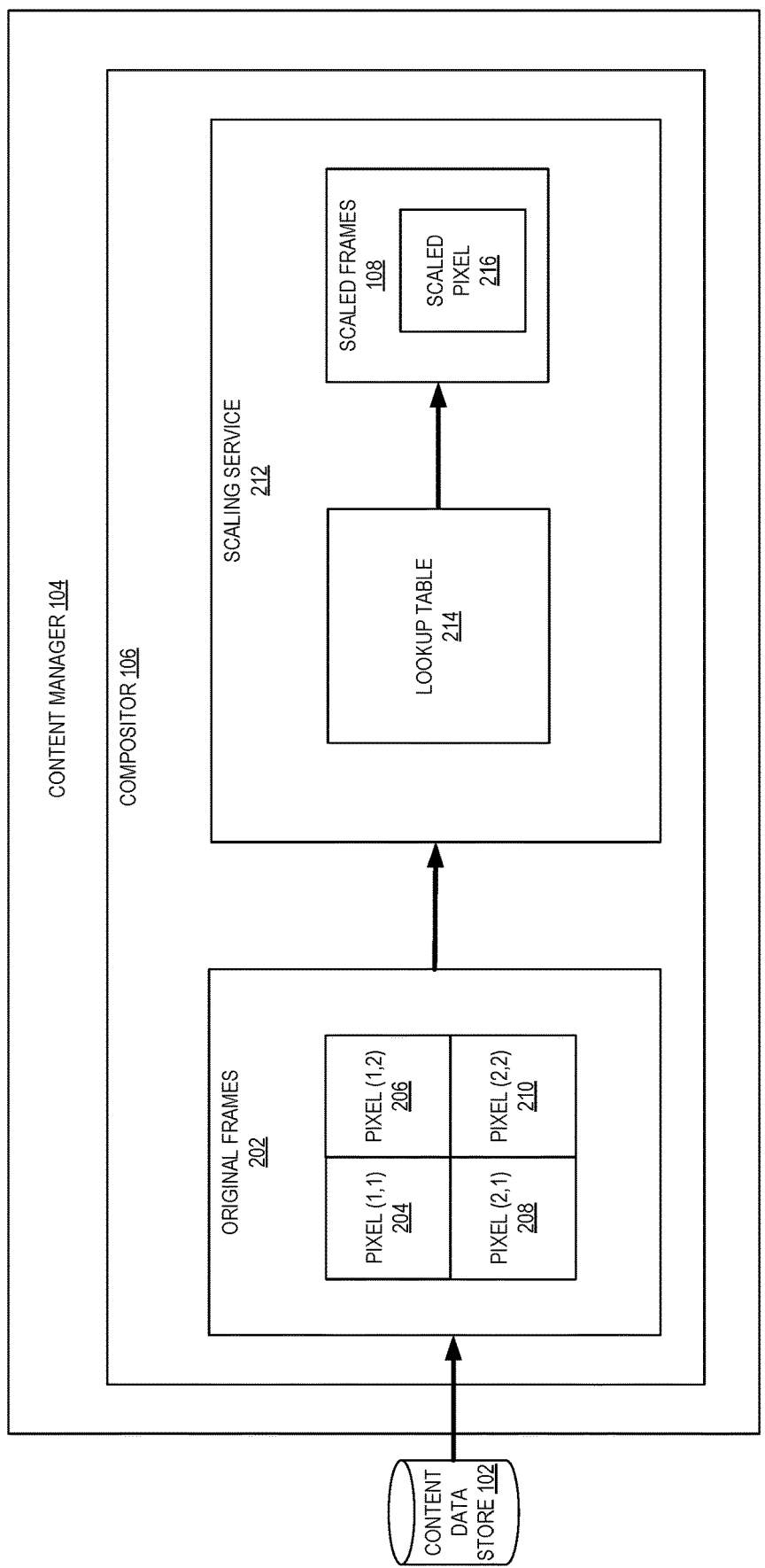
FIG. 2 is a diagram illustrating a compositor including a scaling service according to some embodiments.

FIG. 2 is a diagram illustrating a compositor 106 including a scaling service 212 according to some embodiments. In certain embodiments, content from content data store 102 (e.g., or directly from content providers 134 in FIG. 1) is input into compositor, e.g., in response to a request to resize (e.g., downscale) the content. For example, the content may include one or more original frames 202. Although the example shows a 2×2 block of pixels (204, 206, 208, 210), it should be understood that other blocks are possible (e.g., 4×4 pixels, etc.). In one embodiment, the original frame 202 is desired to be scaled by a factor of 25%, and thus the four pixels (204, 206, 208, 210) are to be scaled down into a single scaled pixel 216 in scaled frames 108 (e.g., and repeated for each block of pixels in that original frame 202). This process may be performed for an entire video file, e.g., on a frame by frame basis when the video is formed of a plurality of sequential frames. Depicted compositor 106 includes a lookup table 214 to lookup a value (e.g., a non-linear light value) for a first pixel and a second (or more) pixel that is to be combined into a single scaled pixel. In one embodiment, lookup table 214 (e.g., via a request from scaling service 212) performs a lookup therein for a first input of a first non-linear light value of luminance for a first pixel of a plurality of pixels of a video frame and a second input of a second non-linear light value of luminance for a second pixel of the plurality of pixels to generate an output of a third single non-linear light value of luminance for a linear light scaling for the first pixel and the second pixel. In one embodiment, lookup table 214 (e.g., via a request from scaling service 212) performs a lookup therein for a first input of a first integer value of a color space component for a first pixel of a plurality of pixels of a video file and a second input of a second integer value of the color space component for a second pixel of the plurality of pixels to generate an output of a third single integer value of the color space component (e.g., luma component) for a floating-point scaling for the first pixel and the second pixel. The lookup table may be two dimensions (e.g., producing a single output for two inputs), three dimensions (e.g., producing a single output for three inputs), four dimensions (e.g., producing a single output for four inputs), etc. In one embodiment, a two-dimensional lookup table is utilized and thus combining more than two pixels (e.g., combining one or more color space components thereof) includes finding a first output from the lookup table 214 for a first pair of pixels, a second output from the lookup table 214 for a next pair of pixels, etc., (e.g., until all the combinations have a corresponding output). In an example where the original frame 202 is desired to be scaled by a factor of two into pixel (2,2) 210, this can include determining a first non-linear light value output (e.g., for luminance Y) for a first linear light scaling of a first set of non-linear light value inputs from pixel 210 and pixel 204, a second non-linear light value output (e.g., for luminance Y) for a second linear light scaling of a second set of non-linear light value inputs from pixel 210 and pixel 206, a third non-linear light value output (e.g., for luminance Y) for a third linear light scaling of a third set of non-linear light value inputs from pixel 210 and pixel 208. Those three outputs may then be combined to form a single pixel (e.g., the corresponding luminance for the single pixel), e.g., via scaling operations 308 in FIG. 3.

In one embodiment, a separate lookup table is included for each color space component, e.g., a first lookup table for a luminance (Y) component, a second lookup able for a blue projection chrominance (U) component, and a third lookup table for a red projection chrominance V) component. In one embodiment, only a single lookup table is provided, e.g., only for a luminance (Y) component.

Figure 3:
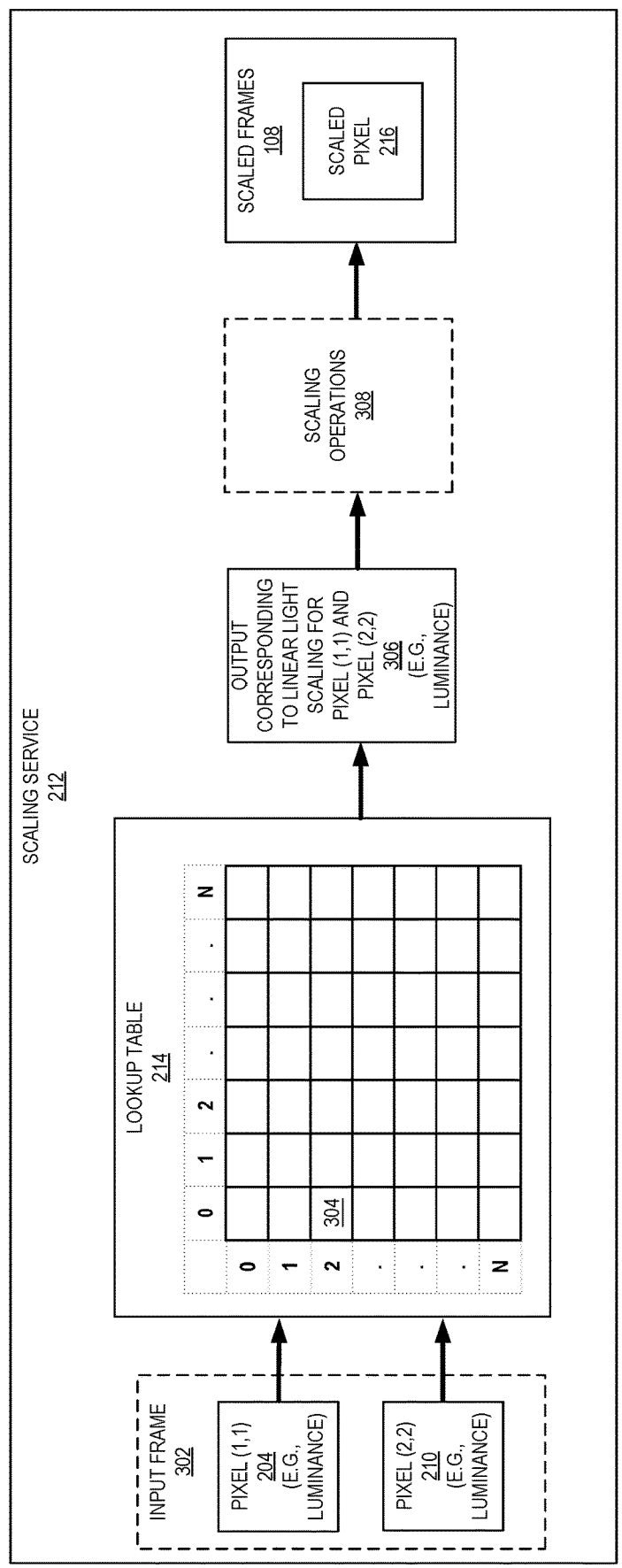
FIG. 3 is a diagram illustrating a scaling service according to some embodiments.

FIG. 3 is a diagram illustrating a scaling service 212 according to some embodiments. In certain embodiments, scaling service 212 is to determine a linear light scaling of input frame 302 (e.g., non-linear light value of the color space (e.g., luma) component of pixel 204 and non-linear light value of the color space (e.g., luma) component pixel 210) and thus inputs the values for the pixels into lookup table 214 which generates an output corresponding to the linear light scaling for those pixels 306, e.g., without converting the inputs to linear light values during the lookup.

In an example where the original frame 202 is desired to be scaled by a factor of two into pixel (2,2) 210, this can include determining a first non-linear light value output 306 (e.g., for luminance Y) for a first linear light scaling of a first set of non-linear light value inputs from pixel 210 and pixel 204, a second non-linear light value output (e.g., for luminance Y) for a second linear light scaling of a second set of non-linear light value inputs from pixel 210 and pixel 206, a third non-linear light value output (e.g., for luminance Y) for a third linear light scaling of a third set of non-linear light value inputs from pixel 210 and pixel 208. Those three outputs may then be combined, e.g., by optional scaling operations 308. Scaling operations 308 may include taking an arithmetic mean of the outputs from lookup table 214 for a single frame to combine those outputs into scaled frame 108 (e.g., to combine the outputs into a scaled pixel 216 that is used to form scaled frame 108). Lookup table 214 may include a first input and a second input (e.g., from 0 to N, where N is any positive integer). In one embodiment, N is the maximum value of the non-linear light color space being utilized by the format of the frame. In one embodiment, N is 1023.

In certain embodiments, the entries of the lookup table 214 are populated before being used for a lookup. As one example, populating (e.g., for a particular color space) includes converting a first non-linear (e.g., integer) value of a color space component to a first linear (e.g., floating-point) value of the color space component, converting a second non-linear (e.g., integer value) of the color space component to a second non-linear (e.g., floating-point) value of the color space component, performing a linear (e.g., floating-point) scaling on the first linear (e.g., floating-point) value and the second linear (e.g., floating-point) value to generate a third linear (e.g., floating-point) value, converting the third linear (e.g., floating-point) value to a third single non-linear (e.g., integer) value of the color space component, and storing the third single non-linear (e.g., integer) value in an element of the lookup table that maps to the first input and the second input. For example, entry 304 thus indicates a resultant single non-linear (e.g., integer) value for an input of 0 for a first non-linear (e.g., integer) value of the color space component (e.g., luma component) of a first pixel and an input of 2 for a second non-linear (e.g., integer) value of the color space component (e.g., luma component) of a second pixel. In one embodiment, linear light scaling includes performing the arithmetic mean of the linear light values, e.g., in floating-point format but not in integer format.

Figure 4:
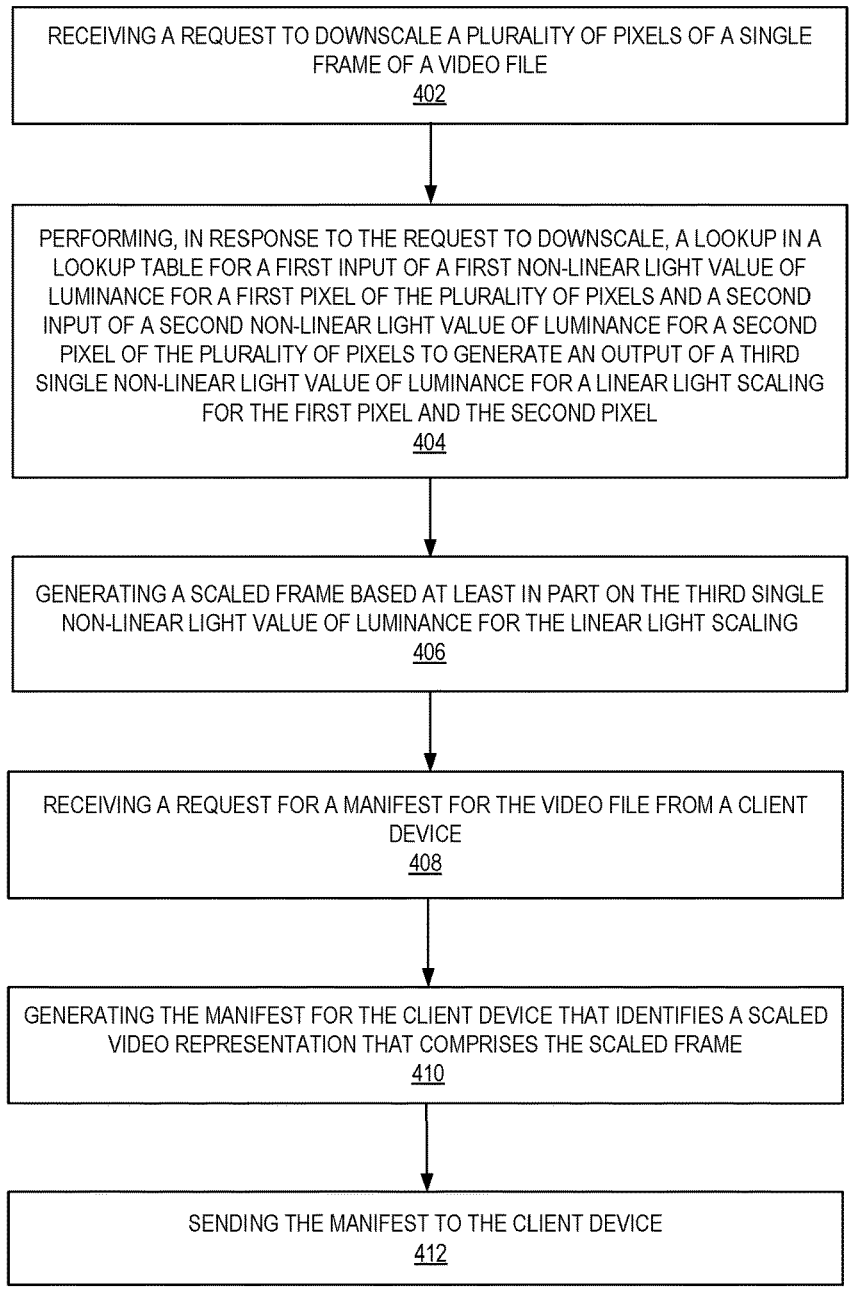
FIG. 4 is a flow diagram illustrating operations of a method for servicing a manifest request from a client device for a scaled video representation according to some embodiments.

FIG. 4 is a flow diagram illustrating operations 400 of a method for servicing a manifest request from a client device for a scaled video representation according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by a scaling service 212 of the other figures.

The operations 400 include, at block 402, receiving a request to downscale a plurality of pixels of a single frame of a video file. The operations 400 further include, at block 404, performing, in response to the request to downscale, a lookup in a lookup table for a first input of a first non-linear light value of luminance for a first pixel of the plurality of pixels and a second input of a second non-linear light value of luminance for a second pixel of the plurality of pixels to generate an output of a third single non-linear light value of luminance for a linear light scaling for the first pixel and the second pixel. The operations 400 further include, at block 406, generating a scaled frame based at least in part on the third single non-linear light value of luminance for the linear light scaling. The operations 400 further include, at block 408, receiving a request for a manifest for the video file from a client device. The operations 400 further include, at block 410, generating the manifest for the client device that identifies a scaled video representation that comprises the scaled frame. The operations 400 further include, at block 412, sending the manifest to the client device.

Figure 5:
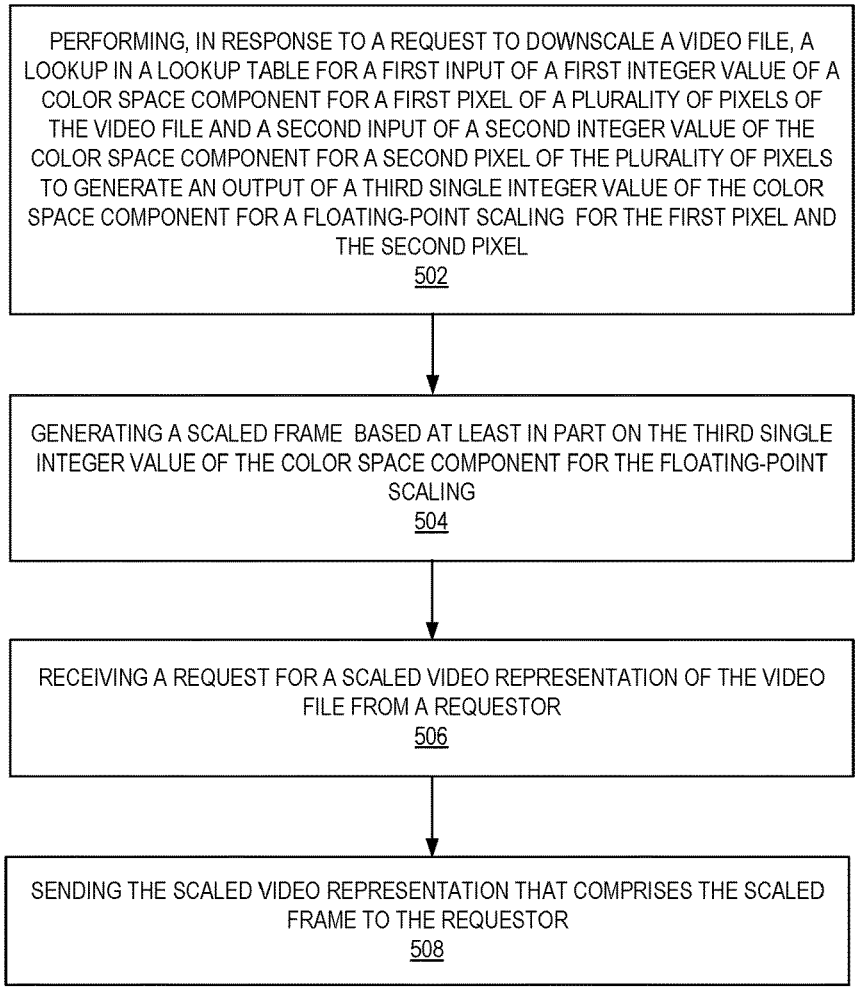
FIG. 5 is a flow diagram illustrating operations of another method for servicing a request from a requestor for a scaled video representation according to some embodiments.

FIG. 5 is a flow diagram illustrating operations 500 of another method for servicing a request from a requestor (e.g., a request from a requesting service) for a scaled video representation according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a scaling service 212 of the other figures.

The operations 500 include, at block 502, performing, in response to a request to downscale a video file, a lookup in a lookup table for a first input of a first integer value of a color space component for a first pixel of a plurality of pixels of the video file and a second input of a second integer value of the color space component for a second pixel of the plurality of pixels to generate an output of a third single integer value of the color space component for a floating-point scaling for the first pixel and the second pixel. The operations 500 include, at block 504, generating a scaled frame based at least in part on the third single integer value of the color space component for the floating-point scaling. The operations 500 include, at block 506, receiving a request for a scaled video representation of the video file from a requestor. The operations 500 include, at block 508, sending the scaled video representation that comprises the scaled frame to the requestor.

Exemplary environments, systems, etc. that the above may be used in are detailed below.

At least some embodiments of the disclosed technologies can be described in view of the following examples:
Example 1. A computer-implemented method comprising:
receiving a request to downscale a plurality of pixels of a single frame of a video file;
performing, in response to the request to downscale, a lookup in a lookup table for a first input of a first non-linear light value of luminance for a first pixel of the plurality of pixels and a second input of a second non-linear light value of luminance for a second pixel of the plurality of pixels to generate an output of a third single non-linear light value of luminance for a linear light scaling for the first pixel and the second pixel;
generating a scaled frame based at least in part on the third single non-linear light value of luminance for the linear light scaling;
receiving a request for a manifest for the video file from a client device;
generating the manifest for the client device that identifies a scaled video representation that comprises the scaled frame; and
sending the manifest to the client device.
Example 2. The computer-implemented method of example 1, further comprising:
performing, in response to the request to downscale, a second lookup in the lookup table for the first input of the first non-linear light value of luminance for the first pixel of the plurality of pixels and a third input of a fourth non-linear light value of luminance for a third pixel of the plurality of pixels to generate a second output of a fifth single non-linear light value of luminance for a second linear light scaling for the first pixel and the third pixel, wherein the generating the scaled frame comprises generating the scaled frame based at least in part on the third single non-linear light value of luminance for the linear light scaling for the first pixel and the second pixel and the fifth single non-linear light value of luminance for the second linear light scaling for the first pixel and the third pixel.

Example 3. The computer-implemented method of example 2, wherein the generating the scaled frame comprises performing a scaling operation on the third single non-linear light value of luminance for the linear light scaling and the fifth single non-linear light value of luminance for the second linear light scaling to create a single pixel of the scaled frame from the first pixel, the second pixel, and the third pixel.

Example 4. A computer-implemented method comprising:
performing, in response to a request to downscale a video file, a lookup in a lookup table for a first input of a first integer value of a color space component for a first pixel of a plurality of pixels of the video file and a second input of a second integer value of the color space component for a second pixel of the plurality of pixels to generate an output of a third single integer value of the color space component for a floating-point scaling for the first pixel and the second pixel;
generating a scaled frame based at least in part on the third single integer value of the color space component for the floating-point scaling;
receiving a request for a scaled video representation of the video file from a requestor; and
sending the scaled video representation that comprises the scaled frame to the requestor.

Example 5. The computer-implemented method of example 4, further comprising:
performing, in response to the request to downscale, a second lookup in the lookup table for the first input of the first integer value of the color space component for the first pixel of the plurality of pixels and a third input of a fourth integer value of the color space component for a third pixel of the plurality of pixels to generate a second output of a fifth single integer value of the color space component for a second floating-point scaling for the first pixel and the third pixel, wherein the generating the scaled frame comprises generating the scaled frame based at least in part on the third single integer value of the color space component for the floating-point scaling for the first pixel and the second pixel and the fifth single integer value of the color space component for the second floating-point scaling for the first pixel and the third pixel.

Example 6. The computer-implemented method of example 5, wherein the generating the scaled frame comprises performing a scaling operation on the third single integer value of the color space component for the floating-point scaling and the fifth single integer value of the color space component for the second floating-point scaling to create a single pixel of the scaled frame from the first pixel, the second pixel, and the third pixel.

Example 7. The computer-implemented method of example 6, wherein the scaling operation is an arithmetic mean of the third single integer value of the color space component for the floating-point scaling and the fifth single integer value of the color space component for the second floating-point scaling.

Example 8. The computer-implemented method of example 4, further comprising generating a scaled pixel based at least in part on the third single integer value of the color space component for the floating-point scaling, wherein the generating the scaled frame comprises generating the scaled frame based at least in part on the scaled pixel.

Example 9. The computer-implemented method of example 4, further comprising, before performing the lookup:
converting the first integer value of the color space component to a first floating-point value of the color space component;
converting the second integer value of the color space component to a second floating-point value of the color space component;
performing the floating-point scaling on the first floating-point value and the second floating-point value to generate a third floating-point value;
converting the third floating-point value to the third single integer value of the color space component; and
storing the third single integer value in an element of the lookup table that maps to the first input and the second input.

Example 10. The computer-implemented method of example 4, wherein the performing the lookup does not include an integer to floating-point conversion of the first input and the second input.

Example 11. The computer-implemented method of example 4, wherein the performing the lookup comprises receiving a third input of a fourth integer value of the color space component for a third pixel of the plurality of pixels, and the generating the output of the third single integer value of the color space component is for the floating-point scaling for the first pixel, the second pixel, and the third pixel.

Example 12. The computer-implemented method of example 4, wherein the first integer value of the color space component for the first pixel and the second integer value of the color space component for the second pixel are generated by a gamma electro-optical transfer function.

Example 13. The computer-implemented method of example 4, wherein the floating-point scaling is according to a perceptual quantizer electro-optical transfer function or wherein the floating-point scaling is according to a High Dynamic Range (HDR) standard.

Example 14. The computer-implemented method of example 4, wherein the color space component is a luma component.

Example 15. A system comprising:
a content data store to store a video file; and
one or more electronic devices to implement a content manager service, the content manager service including instructions that upon execution cause the content manager service to perform operations comprising:
performing, in response to a request to downscale the video file, a lookup in a lookup table for a first input of a first integer value of a color space component for a first pixel of a plurality of pixels of the video file and a second input of a second integer value of the color space component for a second pixel of the plurality of pixels to generate an output of a third single integer value of the color space component for a floating-point scaling for the first pixel and the second pixel;

generating a scaled frame based at least in part on the third single integer value of the color space component for the floating-point scaling;
receiving a request for a scaled video representation of the video file from a requestor; and
sending the scaled video representation that comprises the scaled frame to the requestor.

Example 16. The system of example 15, wherein the instructions upon execution cause the content manager service to further perform operations comprising:

performing, in response to the request to downscale, a second lookup in the lookup table for the first input of the first integer value of the color space component for the first pixel of the plurality of pixels and a third input of a fourth integer value of the color space component for a third pixel of the plurality of pixels to generate a second output of a fifth single integer value of the color space component for a second floating-point scaling for the first pixel and the third pixel, wherein the generating the scaled frame comprises generating the scaled frame based at least in part on the third single integer value of the color space component for the floating-point scaling for the first pixel and the second pixel and the fifth single integer value of the color space component for the second floating-point scaling for the first pixel and the third pixel.

Example 17. The system of example 16, wherein the instructions upon execution cause the content manager service to perform operations wherein the generating the scaled frame comprises performing a scaling operation on the third single integer value of the color space component for the floating-point scaling and the fifth single integer value of the color space component for the second floating-point scaling to create a single pixel of the scaled frame from the first pixel, the second pixel, and the third pixel.

Example 18. The system of example 15, wherein the instructions upon execution cause the content manager service to further perform operations comprising generating a scaled pixel based at least in part on the third single integer value of the color space component for the floating-point scaling, wherein the generating the scaled frame comprises generating the scaled frame based at least in part on the scaled pixel.

Example 19. The system of example 15, wherein the instructions upon execution cause the content manager service to perform operations wherein the performing the lookup does not include an integer to floating-point conversion of the first input and the second input.

Example 20. The system of example 15, wherein the instructions upon execution cause the content manager service to perform operations wherein the performing the lookup comprises receiving a third input of a fourth integer value of the color space component for a third pixel of the plurality of pixels, and the generating the output of the third single integer value of the color space component is for the floating-point scaling for the first pixel, the second pixel, and the third pixel.

Figure 6:
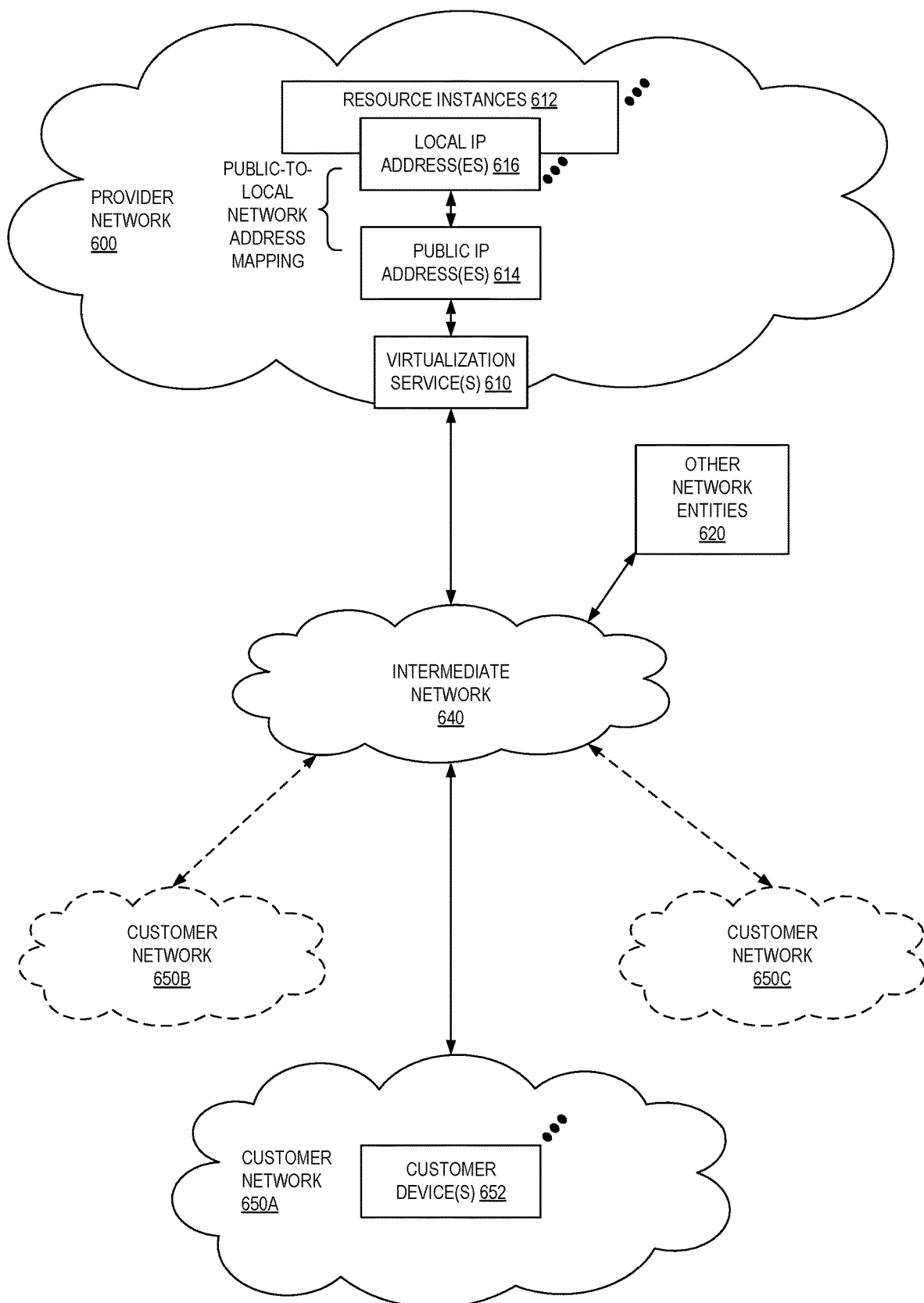
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer.

These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
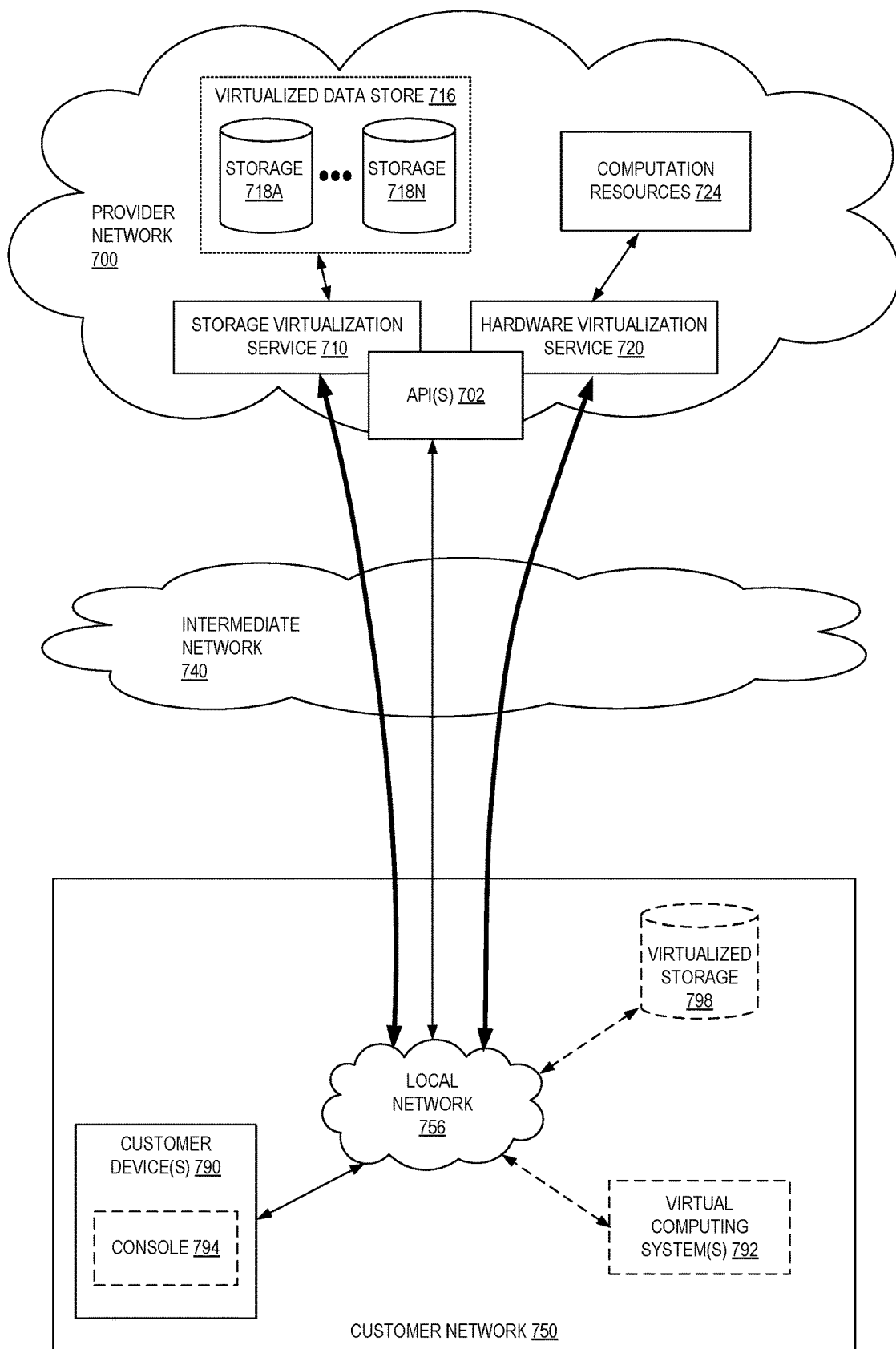
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative System

Figure 8:
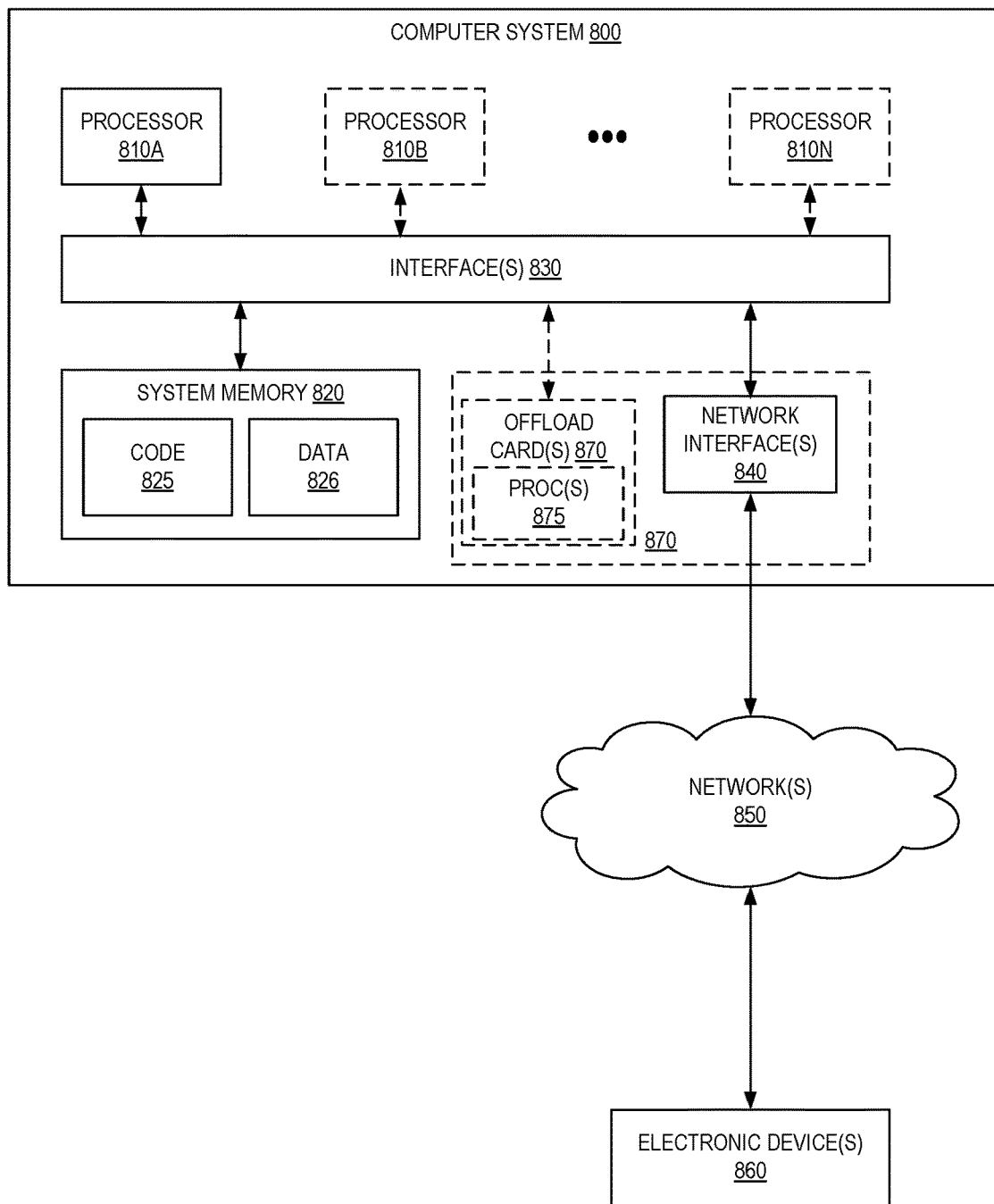
FIG. 8 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Figure 9:
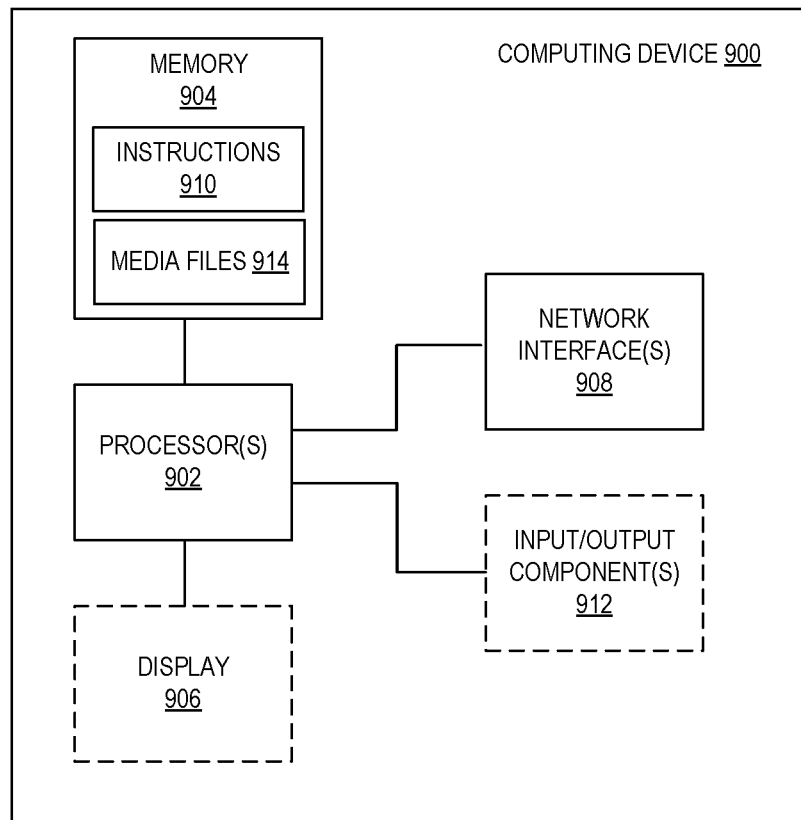
FIG. 9 illustrates a logical arrangement of a set of general components of an exemplary computing device that can be utilized in accordance with various embodiments.

FIG. 9 illustrates a logical arrangement of a set of general components of an example computing device 900. Generally, a computing device 900 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 902 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 904) to store code (for example, instructions 910, e.g., which implement a scaling service as disclosed herein) and/or media files 914 (e.g., generated by encoder 110 in FIG. 1), and a set of one or more wired or wireless network interfaces 908 allowing the electronic device to transmit data to and receive data from other computing devices, typically across one or more networks (e.g., Local Area Networks (LANs), the Internet). For example, where computing device 900 is an instance of client device 118 in FIG. 1, e.g., and is coupled via network interface(s) 908 to content delivery system 102 in FIG. 1. The coupling of the set of processors and other components is typically through one or more interconnects within the electronic device, (e.g., busses and possibly bridges). Thus, the non-transitory machine-readable storage media (e.g., memory 904) of a given electronic device typically stores code (e.g., instructions 910) for execution on the set of one or more processors 902 of that electronic device. One or more parts of various embodiments may be implemented using different combinations of software, firmware, and/or hardware.

A computing device 900 can include some type of display element 906, such as a touch screen or liquid crystal display (LCD), although many devices such as portable media players might convey information via other means, such as through audio speakers, and other types of devices such as server end stations may not have a display element 906 at all. As discussed, some computing devices used in some embodiments include at least one input and/or output component(s) 912 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 10:
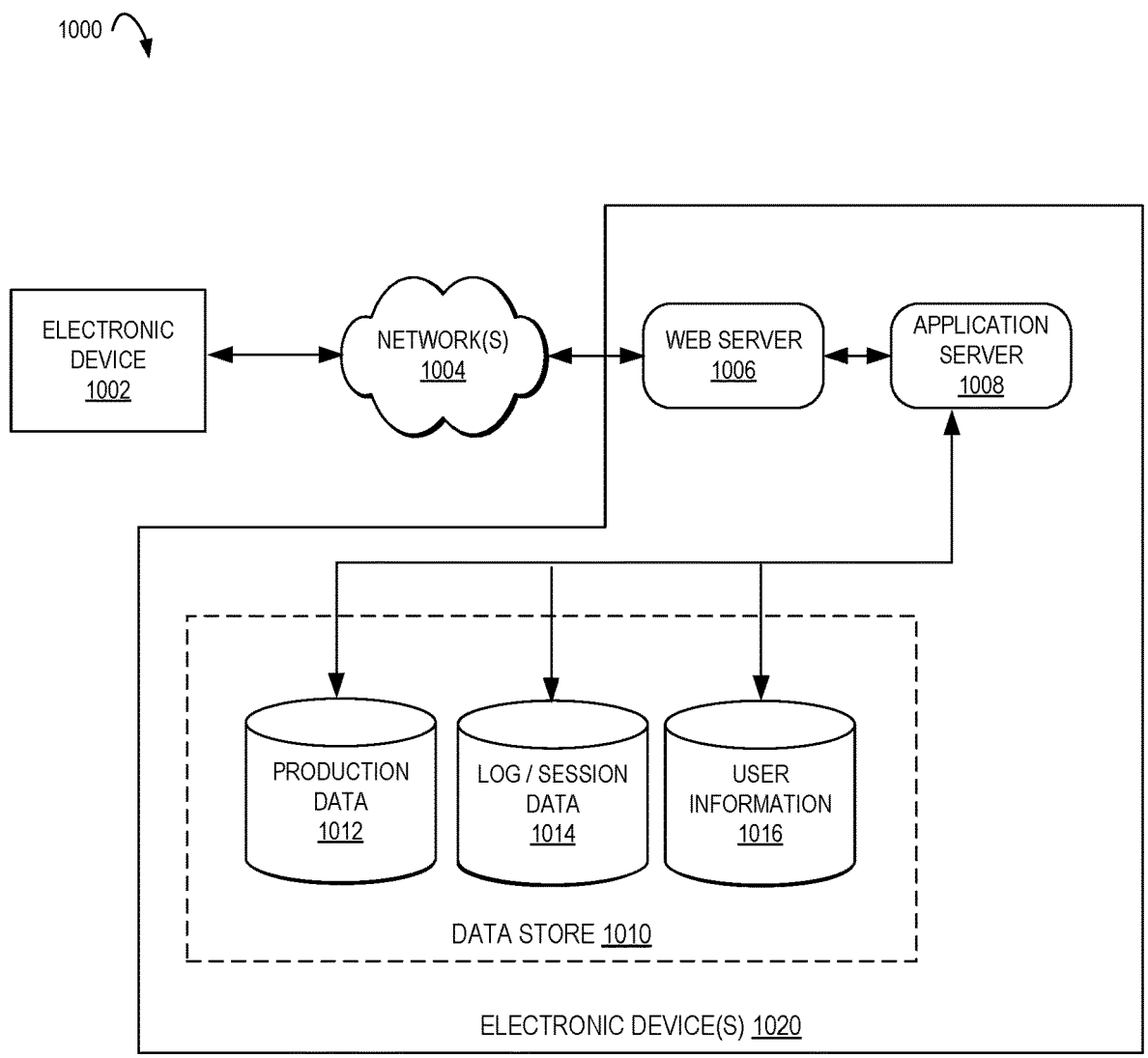
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. For example, in some embodiments messages are HyperText Transfer Protocol (HTTP) requests that are received by a web server (e.g., web server 1006), and the users, via electronic devices, may interact with the provider network via a web portal provided via the web server 1006 and application server 1008. As will be appreciated, although a web-based environment is used for purposes of explanation, different environments may be used, as appropriate, to implement various embodiments. The system includes an electronic client device 1002, which may also be referred to as a client device and can be any appropriate device operable to send and receive requests, messages or information over an appropriate network 1004 and convey information back to a user of the device 1002. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1004 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1004 includes the Internet, as the environment includes a web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device 1002 and handling a majority of the data access and business logic for an application. The application server 1008 provides access control services in cooperation with the data store 1010 and is able to generate content such as text, graphics, audio, video, etc., to be transferred to the client device 1002, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1002 and the application server 1008, can be handled by the web server 1006. It should be understood that the web server 1006 and application server 1008 are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store 1010 also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store 1010 might access the user information 1016 to verify the identity of the user and can access a production data 1012 to obtain information about items of that type. The information can then be returned to the user, such as in a listing of results on a web page that the user is able to view via a browser on the user device 1002. Information for a particular item of interest can be viewed in a dedicated page or window of the browser.

The web server 1006, application server 1008, and/or data store 1010 may be implemented by one or more electronic devices 1020, which can also be referred to as electronic server devices or server end stations, and may or may not be located in different geographic locations. Each of the one or more electronic devices 1020 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
converting a first integer value of a color space component to a first floating-point value of the color space component;
converting a second integer value of the color space component to a second floating-point value pf the color space component;
performing a floating-point scaling on the first floating-point value and the second floating-point value to generate a third floating-point value;
converting the third floating-point value to a third single integer value of the color space component;
storing the third single integer value in an element of a lookup table that maps to the first integer value and the second integer value;
performing, in response to a request to downscale a video file, a lookup in the lookup table for a first input of the first integer value of the color space component for a first pixel of a plurality of pixels of the video file and a second input of the second integer value of the color space component for a second pixel of the plurality of pixels to generate an output of the third single integer value of the color space component for the floating-point scaling for the first pixel and the second pixel;
generating a scaled frame based at least in part on the third single integer value of the color space component for the floating-point scaling;
receiving a request for a scaled video representation of the video file from a requestor; and
sending the scaled video representation that comprises the scaled frame to the requestor.

2. The computer-implemented method of claim 1, further comprising:
performing, in response to the request to downscale, a second lookup in the lookup table for the first input of the first integer value of the color space component for the first pixel of the plurality of pixels and a third input of a fourth integer value of the color space component for a third pixel of the plurality of pixels to generate a second output of a fifth single integer value of the color space component for a second floating-point scaling for the first pixel and the third pixel, wherein the generating the scaled frame comprises generating the scaled frame based at least in part on the third single integer value of the color space component for the floating-point scaling for the first pixel and the second pixel and the fifth single integer value of the color space component for the second floating-point scaling for the first pixel and the third pixel.

3. The computer-implemented method of claim 2, wherein the generating the scaled frame comprises performing a scaling operation on the third single integer value of the color space component for the floating-point scaling and the fifth single integer value of the color space component for the second floating-point scaling to create a single pixel of the scaled frame from the first pixel, the second pixel, and the third pixel.

4. The computer-implemented method of claim 3, wherein the scaling operation is an arithmetic mean of the third single integer value of the color space component for the floating-point scaling and the fifth single integer value of the color space component for the second floating-point scaling.

5. The computer-implemented method of claim 1, further comprising generating a scaled pixel based at least in part on the third single integer value of the color space component for the floating-point scaling, wherein the generating the scaled frame comprises generating the scaled frame based at least in part on the scaled pixel.

6. The computer-implemented method of claim 1, wherein the performing the lookup does not include an integer to floating-point conversion of the first input and the second input.

7. The computer-implemented method of claim 1, wherein the performing the lookup comprises receiving a third input of a fourth integer value of the color space component for a third pixel of the plurality of pixels, and the generating the output of the third single integer value of the color space component is for the floating-point scaling for the first pixel, the second pixel, and the third pixel.

8. The computer-implemented method of claim 1, wherein the first integer value of the color space component for the first pixel and the second integer value of the color space component for the second pixel are generated by a gamma electro-optical transfer function.

9. The computer-implemented method of claim 1, wherein the floating-point scaling is according to a perceptual quantizer electro-optical transfer function.

10. The computer-implemented method of claim 1, wherein the color space component is a luma component.

11. A system comprising:
a content data store to store a video file; and
one or more electronic devices to implement a content manager service, the content manager service including instructions that upon execution cause the content manager service to perform operations comprising:
converting a first integer value of a color space component to a first floating-point value of the color space component;
converting a second integer value of the color space component to a second floating-point value of the color space component;
performing a floating-point scaling on the first floating-point value and the second floating-point value to generate a third floating-point value;
converting the third floating-point value to a third single integer value of the color space component;
storing the third single integer value in an element of a lookup table that maps to the first integer value and the second integer value;
performing, in response to a request to downscale the video file, a lookup in the lookup table for a first input of the first integer value of the color space component for a first pixel of a plurality of pixels of the video file and a second input of the second integer value of the color space component for a second pixel of the plurality of pixels to generate an output of the third single integer value of the color space component for the floating-point scaling for the first pixel and the second pixel;
generating a scaled frame based at least in part on the third single integer value of the color space component for the floating-point scaling;

receiving a request for a scaled video representation of the video file from a requestor; and sending the scaled video representation that comprises the scaled frame to the requestor.

12. The system of claim 11, wherein the instructions upon execution cause the content manager service to further perform operations comprising generating a scaled pixel based at least in part on the third single integer value of the color space component for the floating-point scaling, wherein the generating the scaled frame comprises generating the scaled frame based at least in part on the scaled pixel.

13. The system of claim 11, wherein the instructions upon execution cause the content manager service to perform operations wherein the performing the lookup does not include an integer to floating-point conversion of the first input and the second input.

14. A computer-implemented method comprising:
performing, in response to a request to downscale a video file, a lookup in a lookup table for a first input of a first integer value of a color space component for a first pixel of a plurality of pixels of the video file and a second input of a second integer value of the color space component for a second pixel of the plurality of pixels to generate an output of a third single integer value of the color space component for a floating-point scaling for the first pixel and the second pixel;

performing, in response to the request to downscale, a second lookup in the lookup table for the first input of the first integer value of the color space component for the first pixel of the plurality of pixels and a third input of a fourth integer value of the color space component for a third pixel of the plurality of pixels to generate a second output of a fifth single integer value of the color space component for a second floating-point scaling for the first pixel and the third pixel;

generating a scaled frame based at least in part on the third single integer value of the color space component for the floating-point scaling for the first pixel and the second pixel and the fifth single integer value of the color space component for the second floating-point scaling for the first pixel and the third pixel;

receiving a request for a scaled video representation of the video file from a requestor; and sending the scaled video representation that comprises the scaled frame to the requestor.

15. The computer-implemented method of claim 14, wherein the generating the scaled frame comprises performing a scaling operation on the third single integer value of the color space component for the floating-point scaling and the fifth single integer value of the color space component for the second floating-point scaling to create a single pixel of the scaled frame from the first pixel, the second pixel, and the third pixel.

16. The computer-implemented method of claim 15, wherein the scaling operation is an arithmetic mean of the third single integer value of the color space component for the floating-point scaling and the fifth single integer value of the color space component for the second floating-point scaling.

17. A system comprising:
a content data store to store a video file; and
one or more electronic devices to implement a content manager service, the content manager service including instructions that upon execution cause the content manager service to perform operations comprising:

performing, in response to a request to downscale the video file, a lookup in a lookup table for a first input of a first integer value of a color space component for a first pixel of a plurality of pixels of the video file and a second input of a second integer value of the color space component for a second pixel of the plurality of pixels to generate an output of a third single integer value of the color space component for a floating-point scaling for the first pixel and the second pixel;

performing, in response to the request to downscale, a second lookup in the lookup table for the first input of the first integer value of the color space component for the first pixel of the plurality of pixels and a third input of a fourth integer value of the color space component for a third pixel of the plurality of pixels to generate a second output of a fifth single integer value of the color space component for a second floating-point scaling for the first pixel and the third pixel;

generating a scaled frame based at least in part on the third single integer value of the color space component for the floating-point scaling for the first pixel and the second pixel and the fifth single integer value of the color space component for the second floating-point scaling for the first pixel and the third pixel;

receiving a request for a scaled video representation of the video file from a requestor; and sending the scaled video representation that comprises the scaled frame to the requestor.

18. The system of claim 17, wherein the instructions upon execution cause the content manager service to perform operations wherein the generating the scaled frame comprises performing a scaling operation on the third single integer value of the color space component for the floating-point scaling and the fifth single integer value of the color space component for the second floating-point scaling to create a single pixel of the scaled frame from the first pixel, the second pixel, and the third pixel.

19. A computer-implemented method comprising:
performing, in response to a request to downscale a video file, a lookup in a lookup table for a first input of a first integer value of a color space component for a first pixel of a plurality of pixels of the video file and a second input of a second integer value of the color space component for a second pixel of the plurality of pixels to generate an output of a third single integer value of the color space component for a floating-point scaling for the first pixel and the second pixel;

generating a scaled frame based at least in part on the third single integer value of the color space component for the floating-point scaling;

receiving a request for a scaled video representation of the video file from a requestor; and sending the scaled video representation that comprises the scaled frame to the requestor, wherein the performing the lookup comprises receiving a third input of a fourth integer value of the color space component for a third pixel of the plurality of pixels, and the generating the output of the third single integer value of the color space component is for the floating-point scaling for the first pixel, the second pixel, and the third pixel.

20. A system comprising:
a content data store to store a video file; and
one or more electronic devices to implement a content manager service, the content manager service including instructions that upon execution cause the content manager service to perform operations comprising:

performing, in response to a request to downscale the video file, a lookup in a lookup table for a first input of a first integer value of a color space component for a first pixel of a plurality of pixels of the video file and a second input of a second integer value of the color space component for a second pixel of the plurality of pixels to generate an output of a third single integer value of the color space component for a floating-point scaling for the first pixel and the second pixel;

generating a scaled frame based at least in part on the third single integer value of the color space component for the floating-point scaling;

receiving a request for a scaled video representation of the video file from a requestor; and sending the scaled video representation that comprises the scaled frame to the requestor, wherein the performing the lookup comprises receiving a third input of a fourth integer value of the color space component for a third pixel of the plurality of pixels, and the generating the output of the third single integer value of the color space component is for the floating-point scaling for the first pixel, the second pixel, and the third pixel.

\* \* \* \* \*